United States Patent Office 3,421,531
Patented Jan. 14, 1969

3,421,531
SPEED GOVERNING SYSTEMS AND
CONTROL DEVICES THEREFOR
William George Watson, Whitley Bay, England, assignor to C. A. Parson & Company Limited, Newcastle Upon Tyne, England, a corporation of Great Britain
Filed Oct. 15, 1965, Ser. No. 496,414
Claims priority, application Great Britain, Nov. 13, 1964, 46,433/64
U.S. Cl. 137—36    13 Claims
Int. Cl. F01b 25/06; F16k 31/12

ABSTRACT OF THE DISCLOSURE

A steam turbine governing system includes a governor for varying the pressure in a hydraulic system, the pressure in the system controlling the steam valve to the turbine. An anticipatory device in the form of a derivative or differential control device sensitive to rate of change of pressure in the system and, therefore, to rate of change in turbine speed, is operable when the rate of change of pressure in a valve closing sense exceeds a predetermined value to vary rapidly the pressure in the system in a sense to close the steam valve.

---

Figure 1:
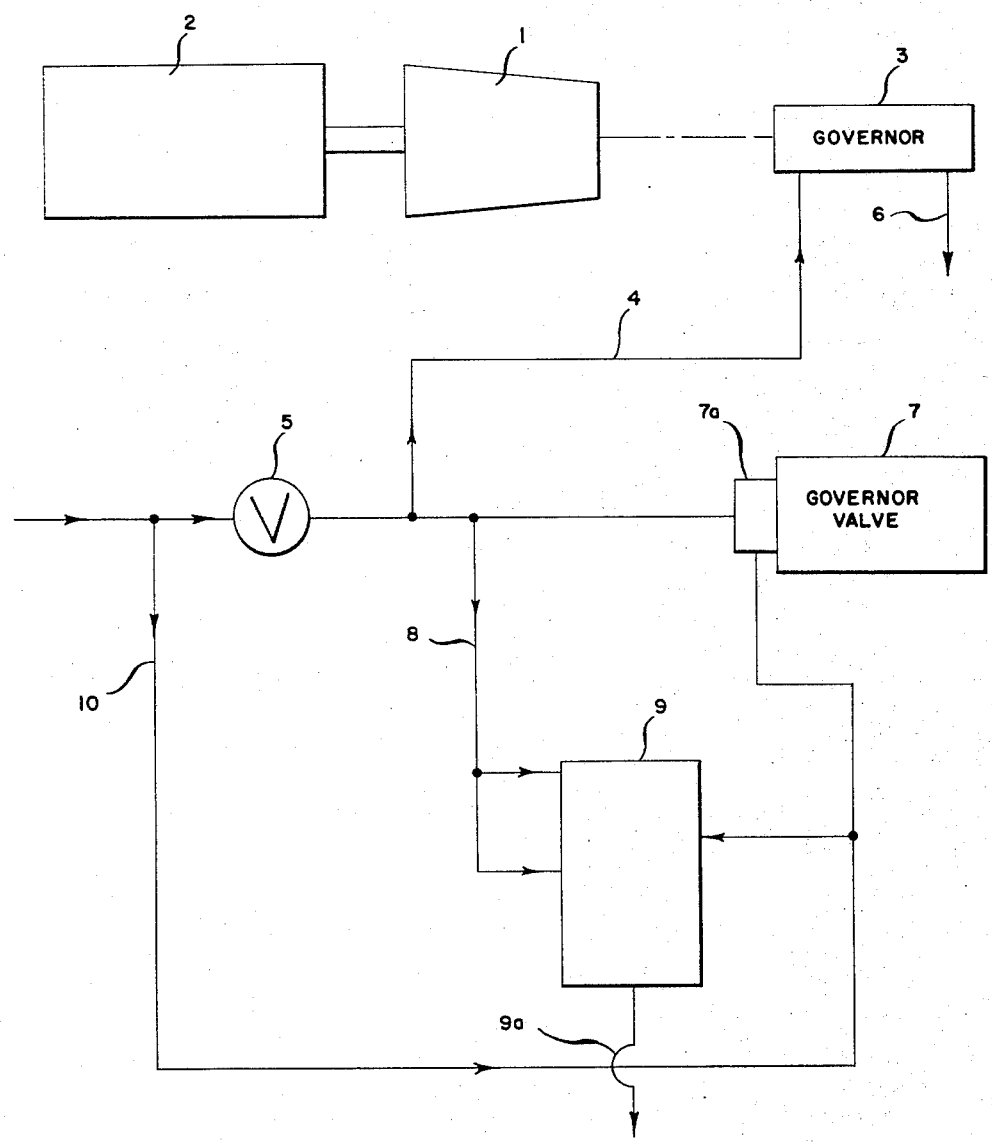

This invention relates to speed governing systems for steam turbines and to control devices for use in such systems.

It is common practice to control the speed and load of large steam turbine plants such as those used in large electrical power stations by means of governing systems which are basically hydraulic systems. In a typical system a change in turbine speed as a result of a change in load on the turbine alters the governor setting on the turbine, and this produces a change in pressure in the hydraulic fluid used in the control system. The change in pressure in the hydraulic fluid alters the position of relays which are associated with governor valves controlling the admission of steam to the turbine. The change of position of the relays effects a change in the valve openings to adjust the flow of steam to the turbine in accordance with the new load condition on the turbine.

In addition to governor valves the governing system may also operate intercept valves in reheat systems. Such valves are provided in connecting steam pipe lines between a reheater and a turbine. The intercept valves are normally fully open, but in the event of the turbine suddenly losing all of its load they close automatically at relatively small overspeed and prevent steam stored in the reheater and connecting pipes from flowing into the turbine, thus avoiding excessive overspeed.

Should the speed of the turbine ever exceed a predetermined value, an emergency overspeed protective system comes into operation. This system operates to shut down emergency stop valves in the system and also acts to close the governor valves and any intercept valves if present. When the emergency protective system comes into operation and closes the emergency stop valves these preferably remain closed until they are re-set manually. This avoids the possibility of the valves reopening prematurely.

It is desirable that the governing system be capable of reacting quickly to any sudden loss of load so as to prevent overspeed of the turbine to such an extent that the emergency overspeed protective system comes into operation to shut down the turbine. With modern high power steam turbines the steam conditions under which they operate and the nature of their construction give them a high accelerating potential. In the event of a sudden loss of load, therefore, the task of the normal governing system becomes increasingly difficult. The speed governor in a normal governing system requires a predetermined speed rise to close the valves and, therefore, it is advantageous to introduce anticipatory means which will anticipate the action of the governor and act immediately or quickly to close the valves without requiring appreciable or substantial speed rise in the event of a sudden loss of load, thus appreciably reducing the overspeed.

In my co-pending application Ser. No. 479,091, filed Aug. 12, 1965, I disclose anticipatory means which are initiated by an electrical signal produced by means sensitive to a change in load on the turbine, the anticipatory means being operable to shut the emergency stop valves and to re-open them automatically after a predetermined time interval. It is often desirable with plants of large outputs to have a separate anticipatory system which is complementary to the electrical anticipatory means but which is hydraulically or otherwise operated.

It is generally the object of the present invention to provide a hydraulic anticipatory system which can be used in conjunction with an electrical anticipatory means, or which can be used independently as the sole means for anticipating governor action on a sudden loss of load on the turbine.

More particularly, it is an object of this invention to provide, in a hydraulic governing system, a control device operatively associated with the hydraulic system and responsive to the rate of change of pressure in the hydraulic system for rapidly varying the pressure in the hydraulic system in the sense to close the governor valve when the rate of change of pressure exceeds a predetermined value.

It is a further object of the invention to provide a system as set forth in the preceding paragraph wherein preferably the control device opens the hydraulic system to drain in response to a predetermined rate of pressure reduction in the hydraulic system.

It is still a further object of this invention to provide a system as set forth above wherein the control device incorporates a dashpot device for detecting rates of pressure change in the hydraulic system in excess of a predetermined rate and for effecting an appropriate change of pressure in the hydraulic system upon detecting the predetermined rate of pressure change.

It is a further object of this invention to provide a system as set forth in any of the preceding paragraphs wherein the release valve for effecting a change of pressure in the hydraulic system is normally maintained in a closed position by hydraulic pressure and is urged toward the open position by an opposing spring, the actuation of the valve taking place through a release of the hydraulic pressure by the control device when the rate of pressure change in the hydraulic control system exceeds the predetermined amount.

It is still a further object of this invention to provide a control device for use in steam turbine hydraulic governor systems which is capable of accomplishing the foregoing objects when incorporated in such a system.

Other and further objects, features and advantages of the invention will be apparent to those skilled in the art from the ensuing description of a preferred exemplary embodiment of the invention. The novel features which I consider characteristic of my invention are defined in the appended claims, but the invention itself will be best understood from the description and drawings of the exemplary embodiment.

The invention generally consists in a speed governing system for a steam turbine comprising a governor sensitive to changes in turbine speed and operable to change the pressure in a hydraulic system which includes governor valves for controlling the admission of steam to the turbine, the pressure changes acting to adjust the opening of the valves, which system incorporates hydraulic anticipatory means in the form of a derivative or differential control device sensitive to rate of change of pressure in the hydraulic system and, therefore, to rate of change in turbine speed, and operable when the rate of change of pressure exceeds a predetermined value to vary rapidly the pressure in the hydraulic system in a sense to allow the governor valves to close.

The invention further generally consists in a hydraulic derivative or differential control device for use in such a governing system, the device comprising generally a release valve operable when open to connect the hydraulic system to the low pressure drain and held in a closed position against the action of a spring by means of a hydraulic power fluid supplied to the device under pressure, the supply of the fluid being controlled by a plunger operated by a dashpot device whereby sudden movement of a dashpot cylinder relative to a dashpot piston upon a sudden change in the pressure in the hydraulic system moves the plunger and releases the pressure in the hydraulic power fluid holding the release valve in the closed position, the release of the pressure in the power fluid allowing the release valve to open.

Figure 2:
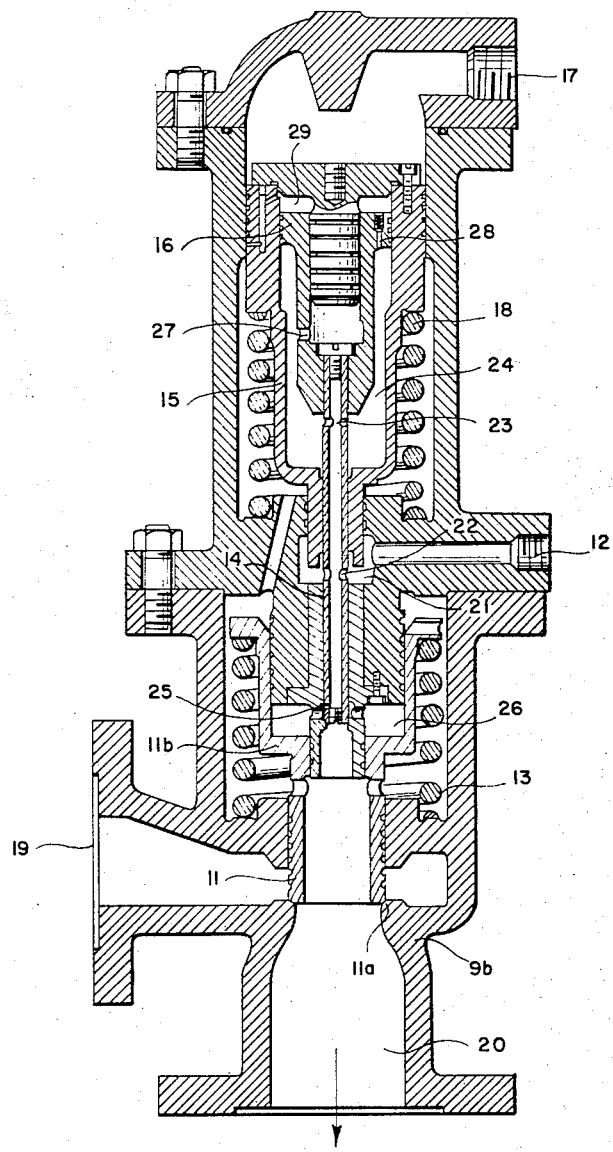

Referring now to the drawings:

FIGURE 1 shows diagrammatically the main components of a hydraulic governing system in accordance with one form of the present invention; and FIGURE 2 shows a partial section through a hydraulic derivative control device in accordance with one embodiment of the invention.

The steam turbine plant of FIGURE 1 comprises a steam turbine 1 driving an electric generator 2. Driven from the turbine shaft is a governor 3 which forms part of a hydraulic speed governing system. For purposes of explanation it will be assumed that the fluid used throughout the system is oil, although of course other fluids may be used instead of or in conjunction with oil. Fire resistant fluids constitute good alternatives. Furthermore, as illustrated the system comprises two main circuits, one circuit being power oil which is used to operate the governor valves, and the other circuit being pilot oil which is at a lower pressure than the power oil and is used to operate relays on the valves. Other circuit arrangements obviously may be used.

Pilot oil is supplied to governor 3 through connection 4 and a pre-set regulating valve 5. From the governor 3 the pilot oil can flow to a low pressure drain through connection 6. The governor is sensitive to changes in the turbine speed and is of the known type which is operable to change the pressure in the pilot oil system so as in turn to effect appropriate adjustment of the governor valves. Controlling the admission of steam to the turbine 1 is governor valve 7 and an associated relay 7a. Pilot oil is supplied to governor valve relay 7a and is also tapped off through connection 8 to hydraulic derivative device 9. The device 9 when operated in response to a sudden rise in turbine speed acts to connect the oil in the pilot oil system to drain 9a, thus reducing quickly the pressure in the system.

The device 9 is also supplied with power oil through connection 10 from a port upstream of regulating valve 5, the power oil being at a higher pressure than the pilot oil downstream of the regulating valve 5.

Referring to FIGURE 2, the device 9 comprises a casing 9b housing a piston operated release valve having a valve body 11 which is held in a closed position against its seat 11a by the pressure of power oil supplied through inlet 12 acting on the piston 11b against the action of a spring 13. The power oil is admitted to the piston 11b under the control of a plunger 14 forming part of a dashpot arrangement comprising a dashpot cylinder 15 and a dashpot piston 16.

Pilot oil from the governor system is admitted to the casing through inlet 17 and acts upon the upper end of dashpot cylinder 15 against the action of spring 18. Pilot oil is also admitted through inlet 19, and when the release valve 11 is open the pilot oil flows to drain through outlet 20, thus reducing quickly the pressure in the governor system. The outlet 20 of FIGURE 2 is indicated schematically at 9a in FIGURE 1.

The plunger 14 is hollow, and power oil entering the casing 9b through inlet 12 enters space 21 surrounding the plunger 14. The power oil then passes to the inside of the plunger through ports 22. From ports 22 the power oil then flows both upwardly and downwardly. The upward flow of pilot oil passes through ports 23 into space 24 beneath the dashpot piston 16 and between the piston and the dashpot cylinder 15. The power oil flowing downwardly passes through restriction 25 when the plunger is at the limit of its downward travel (as illustrated in FIGURE 2) and enters space 26 above the piston 11b. The restriction 25 limits the flow of oil into space 26 and thus maintains the power oil pressure in the dashpot cylinder under all conditions of operation. The power oil in space 26 acts on the piston 11b to hold the release valve 11 in the closed position against the action of spring 13.

Power oil in space 24 passes through port 27 in dashpot piston 16 and enters the inside of the dashpot piston. The power oil also passes through the restriction 28 into the space 29 above the dashpot piston. The power oil in the dashpot arrangement produces a net force acting downwardly on the plunger, holding the plunger against a bottom stop in its position of maximum travel in a downward direction. The action of the power oil is thus to maintain the plunger and hence the dashpot piston 16 stationary for normal running of the turbine. Displaced oil passes from space 24 to space 29, or vice versa, through the bore of the restriction 28, depending upon the direction of movement of the dashpot cylinder. A small difference between the pressures of the two sides of the dashpot piston 16 occurs to permit flow of oil through the restriction 28, but this has no appreciable or substantial effect on the net oil force which acts downwardly on the plunger 14 and holds it against its bottom stop.

Under normal running conditions the pressure of the pilot oil admitted through inlet 17 varies by relatively small amounts and slowly with changes of turbine speed or governor setting. The effect of these changes of pilot oil pressure is to move the dashpot cylinder 15 either up or down relative to the dashpot piston 16 which remains stationary against its bottom stop under the influence of the power oil. If a sudden loss of load occurs on the turbine it accelerates at a rapid rate and causes a relatively rapid fall in the pilot oil pressure entering at inlet 17 due to action of the governor. Spring 18 then takes over and forces the dashpot cylinder rapidly upwardly. Power oil in the space 24 is virtually trapped as it can only escape through restriction 28. In effect the oil acts substantially as a solid body so that movement of the dashpot cylinder 15 in an upward direction causes the piston 16 to follow suit. Movement of the latter produces upward movement of the plunger 14 and thus allows power oil in space 26 to flow to drain. Reducing of pressure in space 26 allows spring 13 to move release valve body 11 upwardly thus opening the valve. Pilot oil can then flow to drain through outlet 20, and the pressure in the pilot oil system quickly collapses, allowing the governor valves to close.

When the pilot oil pressure ceases to fall the net oil force acting downwardly on the dashpot piston and plunger will return the piston and plunger to their extreme downward position against the bottom stop, and the oil release valve will close because of the restoration of power oil pressure in space 26. The rate of the downward movement of the dashpot piston and plunger is controlled by the bore of the restriction 28 and the quantity of displaced oil passing from space 24 to space 29. The speed of the machine is then controlled by the governor in the normal manner.

In the illustrated embodiment a rise in turbine speed produces a reduction in pilot oil pressure, but of course this is not essential. The system and the control device can be adapted or modified to operate with different pressure changes and relationships.

It will be apparent from the foregoing that the system is constructed so that it is responsive to rate of change of pressure in the governor hydraulic system and is, therefore, responsive to rate of change of turbine speed.

The governing system described can be used as a complementary system to one using an electrical anticipatory device, thus providing a back-up against the unlikely possibility of either system failing to work. In some instances an electrical anticipatory device is operated by opening of a circuit breaker, but there are circumstances when the turbine can lose load without the circuit breaker opening, and in such cases a governing system of the kind described herein would take over. The system described can if so desired be the sole anticipatory means, and its use is not dependent on the use of any other anticipatory system.

It will be apparent to persons skilled in the art that the system and the derivative control device are susceptible of various arrangements, adaptations and modifications other than as specifically described and illustrated herein. Thus the power fluid for the device 9 need not be specifically the power fluid which operates the governor valves, although this is preferred when the control device is used in a system of the illustrated type. It should be understood, therefore, that the illustrations and the description are intended to be exemplary of the invention and not to be limiting in any sense. Rather the scope and substance of the invention are as defined in the following claims interpreted in the light of the exemplary illustration and description.

I claim:

1. In a steam turbine system including a steam turbine, a hydraulically operated governor valve for controlling the flow of steam to the turbine, a hydraulic system for controlling the governor valve by the pressure in the hydraulic system, and a governor for varying the pressure in said hydraulic system in response to changes in turbine speed so as in turn to effect a correcting control on the governor valve, the improvement comprising: means operatively associated with said hydraulic system and responsive to the rate of change of pressure in said hydraulic system in a governor valve closing sense for rapidly varying the pressure in said hydraulic system in the sense to close said governor valve only when the rate of change of pressure in a valve closing sense exceeds a predetermined value.

2. Apparatus as set forth in claim 1 wherein said means opens said hydraulic system to drain in response to a predetermined rate of pressure reduction in said hydraulic system.

3. Apparatus as set forth in claim 1 wherein said means ceases to operate and return control of the hydraulic system pressure to said governor after the rate of pressure change falls below said predetermined value.

4. Apparatus as set forth in claim 3 wherein said means incorporates dashpot means.

5. A control device for a steam turbine hydraulic governor system, comprising: means forming a stationary cylinder; a movable hollow dashpot cylinder in said stationary cylinder; means for subjecting one side of said dashpot cylinder to the pressure of a hydraulic control system for a steam turbine so as to tend to move said dashpot cylinder in a first direction upon increases in pressure in the hydraulic system; means urging said dashpot cylinder to move in a second opposite direction upon reductions in pressure in the hydraulic system; a dashpot piston slidably disposed in said dashpot cylinder, said dashpot piston having a restricted fluid passageway intercommunicating its opposite sides; a plunger valve movable with said dashpot piston and extending through said dashpot cylinder; means controlled by said plunger valve for rapidly varying the pressure in the hydraulic system in a predetermined manner upon a predetermined movement of said plunger valve; means for applying fluid pressure to the opposite faces of said dashpot piston so as to exert a normal net force urging said dashpot piston and said plunger in a direction opposite to said predetermined movement of said dashpot piston; whereby a rate of pressure change in the hydraulic system in excess of a predetermined rate will result in movement of said dashpot cylinder and said dashpot piston, while rates of pressure change lower than said predetermined rate will result in movement of said dashpot cylinder independently of said dashpot piston.

6. A governing system for a steam turbine comprising: a hydraulically controlled governor valve adapted for connection to the steam inlet of a steam turbine; a hydraulic system for controlling said governor valve in accordance with the pressure in the hydraulic system; a governor adapted for connection to a steam turbine for varying the pressure in said hydraulic system in accordance with changes in turbine speed so as in turn to vary the setting of said governor valve; a valve controlled drain outlet from said hydraulic system; and dashpot means for opening said valve controlled drain outlet only in response to rates of pressure change in said hydraulic system in excess of a predetermined rate, said valve controlled drain outlet including a drain passage from said hydraulic system, a release valve plunger for opening and closing said drain passage, means for supplying a power fluid under pressure to one portion of said release valve plunger to hold said release valve plunger in its drain passage closing position, and resilient means for urging said release valve plunger to its drain outlet opening position.

7. Apparatus as set forth in claim 6 wherein said dashpot means includes a movable control plunger for selectively connecting said one portion of said release valve plunger to said power fluid or to drain, a first dashpot member connected to said control plunger, means normally urging said first dashpot member and said control plunger in a direction to connect said release valve plunger to said power fluid, a second dashpot member movable relative to said first dashpot member, means for moving said second dashpot member in accordance with changes in the pressure of said hydraulic system, and means for moving said first dashpot member in a direction to connect said power fluid to drain only when the speed of movement of said second dashpot member exceeds a predetermined speed in accordance with a rate of pressure change in said hydraulic system in excess of a predetermined rate.

8. In a steam turbine system including a steam turbine, a hydraulically operated governor valve for controlling the flow of steam to the turbine, a hydraulic system for reducing the opening of said governor valve upon a decrease in pressure in the hydraulic system, and a governor for reducing the pressure in the hydraulic system in response to increases in turbine speed, the improvement comprising: means forming a drain outlet from said hydraulic system; a release valve for opening and closing said drain outlet; a movable piston operatively connected to said release valve; resilient means for urging said movable piston and said release valve in a direction to open said drain outlet; means forming a chamber bounded at least partially by a face of said movable piston such that fluid pressure in said chamber will act against said face so as to move said piston and said release valve in a direction to close said drain outlet; passage means for connecting said chamber to a source of hydraulic power fluid of sufficient pressure to overcome said resilient means and effect closing of said release valve; movable control valve means in said passage for selectively opening said passage means or closing said passage means and connecting said chamber to drain, so as in turn to effect closing or opening said release valve; and means connected to said movable control valve means for normally maintaining said control valve means in a position to open said passage means and for moving said control valve means to close said passage means and connect said chamber to drain only in response to rates of hydraulic system pressure changes in excess of a predetermined rate of pressure change in the hydraulic system.

9. Apparatus as set forth in claim 8 wherein said hydraulic system comprises a pilot fluid system which is variably controlled by said governor and a constant pressure power fluid system, and governor valve relays controlled by said pilot fluid system for regulating the flow of power fluid for controlling said governor valve; and wherein said passage means extends between said chamber and said power fluid system so as to utilize said power fluid system as said source of hydraulic fluid.

10. Apparatus as set forth in claim 8 wherein said means connected to said movable control valve means comprises a first dashpot member connected to said movable control valve means, normally urging said first dashpot member in a direction to effect connection of said chamber to the source of power fluid, a second dashpot member movable relative to said first dashpot member, means for permitting movement of said second dashpot member relative to said first dashpot member at rates of movement lower than a predetermined rate but effecting movement of said first dashpot member with said second dashpot member at rates in excess of said predetermined rate, and means for effecting movement of said second dashpot member in accordance with changes in pressure of said hydraulic system.

11. Apparatus as set forth in claim 10 wherein said last mentioned means comprises means for subjecting one face of said second dashpot member to the pressure of said hydraulic system, and resilient means for urging said second dashpot member in a direction opposing said pressure of said hydraulic system.

12. A control device for use in a hydraulic control system for a steam turbine governor, comprising: means forming a drain outlet adapted for connection to a governor hydraulic control system; release valve means for opening and closing said drain outlet; resilient means urging said release valve in an opening direction; means for selectively applying a force to said release valve means to close said release valve means or removing the force to permit said resilient means to move said release valve means to the open position, said last recited means comprising dashpot controlled means adapted for connection to the hydraulic system for effecting opening of said release valve only in response to rates of pressure change in the hydraulic system in excess of a predetermined rate.

13. Apparatus as set forth in claim 12 wherein said means for selectively applying a force to said release valve means comprises valve means for applying or releasing fluid pressure to or from said release valve means.

References Cited

UNITED STATES PATENTS

| | | | |
|---|---|---|---|
| 1,950,594 | 3/1934 | Bryant | 137—36 X |
| 2,015,861 | 10/1935 | Mitereff | 137—36 |
| 2,386,110 | 10/1945 | Hagemann | 137—34 X |
| 2,548,072 | 4/1951 | Schwendner | 137—36 X |
| 2,855,941 | 10/1958 | Oberle | 137—36 |

CLARENCE R. GORDON, *Primary Examiner.*

U.S. Cl. X.R.

251—50; 251—50